March 16, 1971     J. PETTAVEL     3,570,836
CLAMPING DEVICE FOR IMMOBILISING AN OBJECT ON A SUPPORT TABLE
Filed Dec. 10, 1968
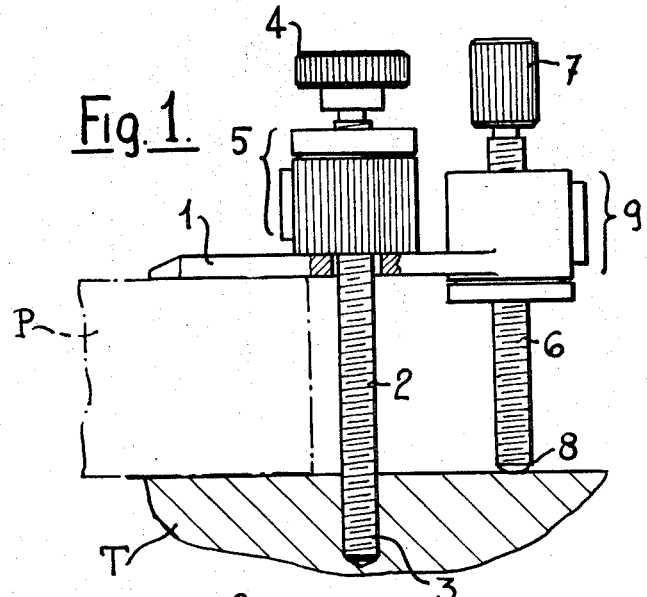
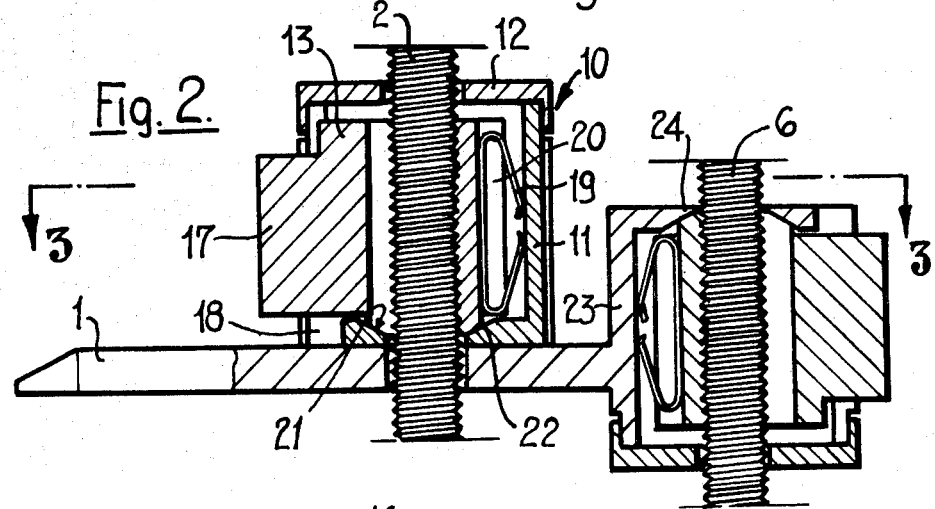
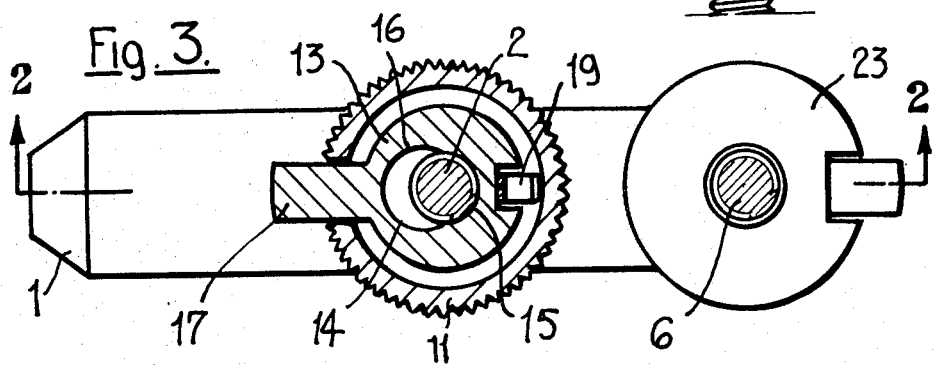
INVENTOR.
Jacques PETTAVEL
BY Kenwood Ross
ATTORNEY.

3,570,836
CLAMPING DEVICE FOR IMMOBILISING AN OBJECT ON A SUPPORT TABLE

Jacques Pettavel, Geneva, Switzerland, assignor to Societe Genevoise d'Instruments de Physique, Geneva, Switzerland
Filed Dec. 10, 1968, Ser. No. 782,665
Int. Cl. B25b 5/02; B23q 3/06
U.S. Cl. 269—92                                2 Claims

ABSTRACT OF THE DISCLOSURE

A clamping device for immobilising an object on a table has a cantilever type clip traversed by a screw which is anchored in the table. An adjustable nut borne coaxially on the screw to exert thrust against the clip can slide on the screw and comprises a slider element transversally movable in a cylindrical box element. The slider has a tapped concave surface which cooperates with the screw thread in a transversally advanced position and is spaced from the screw thread in a retracted position in which the nut can then slide freely axially. The slider can then effect a limited axial movement in the box. The two elements have cooperating conical surfaces to lock and unlock the transverse position of the slider when clamping and releasing respectively. A between box and slider urges it into advanced position. A nose of the slider opposite the concave tapping extends through a slot in the box for operational access. A second similar nut rigidly fixed on the clip is traversed by a second screw which thrusts against the table to increase the grip on the object.

---

The present invention relates to a clamping device intended to immobilise an object on a support table, of the type comprising a clip subject to the action of at least one screw acting on it by means of an adjustable nut on this screw.

It is an object of the invention to provide an improved clamping device of this type.

It is another object to provide a clamping device which can be more readily released.

According to the invention there is provided a clamping device to immobilise an object on a support table, said device comprising a clip subject to the action of at least one screw acting on it by means of an adjustable nut on this screw, wherein the said nut comprises a slider element transversally movable in a box element slidably mounted on the screw, said slider having a surface provided with a tapped portion intended to cooperate with the threading of the screw, and being capable of occupying in the box either a transversally advanced position in which the said portion cooperates with the screw, or a transversally retracted position in which this tapped portion is spaced from the screw which can then slide freely in the box, the slider being moreover capable of a limited axial movement in the box, said two elements having cooperating cam surfaces arranged to lock the slider in said advanced position when an axial thrust is transmitted between the box and the slider to tighten the clip, whilst the slider may be put in retracted position in the absence of thrust between the box and the slider to enable the displacement of the nut by sliding along the screw.

The device according to the invention is intended especially to immobilise a part to be controlled on the table of a measuring apparatus or of a machine-tool and, in one preferred embodiment, it comprises a clip mounted in cantilever manner on a retaining screw rigidly fixed to the table, this clip bearing a rear thrust screw propped on the table.

In order that the invention may be more fully understood, one embodiment of a clamping device according to the invention is described below, purely by way of illustrative but non-limiting example, with reference to the accompanying drawing in which:

FIG. 1 is a view of said embodiment in elevation;

FIG. 2 is a partial view of the embodiment of FIG. 1, on a larger scale, in cross section along the line 2—2 of FIG. 3; and FIG. 3 is a cross section along the line 3—3 of FIG. 2.

The device shown in intended to hold a part P, of any thickness, against a support table T. It comprises a clip 1 mounted in cantilever manner on a front retaining screw 2 screwed by its end 3 into a tapped hole of the table. In a variation, this screw may comprise a sole engaged in a groove of the table. The screw 2 comprises a milled head, designated by 4, and bears a nut 5, described below, constituting a bearing for the face of the clip.

The clip 1 bears a rear thrust screw 6 having a milled head 7, and of which the lower end 8 is supported on the table. The clip 1 cooperates with this screw 6 by means of a nut 9 described below.

The nut 5 comprises a cylindrical box 10 formed from a body 11 and from a cover 12 driven onto this body. The outer surface of the body 11 is milled. The box 10 is mounted slidably on the screw 2 which traverses it freely by passing through the non-threaded openings pierced in the bottom of the body 11 and in the cover 12.

A slider 13 housed with play in the box 10 is axially pierced by a hole 14 giving passage to the screw 2. As is visible in FIG. 3, this hole 14 comprises two parts of different diameters, namely a semi-cylindrical part 15, provided with a taped portion, and of which the diameter corresponds to that of the screw 2, and a part 16 of larger diameter.

The slider 13 comprises a nose 17 extending outside the box 10 through a slot 18 of the body 11. A spring 19, housed in a groove 20 of the slider 13 and supported against the inner surface of the body 11, tends to hold the slider 13 in an advanced position, shown in FIGS. 2 and 3, in which the tapping of the tapped part 15 of the slider is in engagement with the threading of the screw 2.

The slider 13 is moreover capable of a limited axial movement in the box 10, and the bottom of the body 11 has, on the inside of the box, a hollow conical seat 21 in which may be engaged a tronconic part of the end 22 of the slider 13.

The conical seat 21 and the tronconical part 22 of the slider are respectively concentric with the opening of the bottom of the box and with the threaded surface 15 of the slider so that, in the position of use shown, the nut 5 exerting a pressure against the clip 1, the slider 13 is locked in engagement with the screw 2 as a result of the engagement of the cooperating cam surfaces constituted by the seat 21 and by the tronconical part 22.

A rotation of the box 10, which also drives the slider 13, by the nose 17, has the effect of displacing the nut 5 along the screw, the slider 13 being rigidly maintained in advanced position as long as an axial thrust is transmitted as a result of the clamping of the clip.

On the other hand, if the nut 5 is unscrewed, the slider 13 may be disengaged axially from the tronconical seat 22 of the box and, through a pressure exerted on the nose 17, the slider 13 can then be transversally displaced towards the right (FIG. 3), against the action of the spring 19, to disengage the tapped part 15 of the screw 2. The nut 5 is then disengaged from the threading of the screw 2 and may be displaced freely along this latter, by simple sliding, more rapidly than it was necessary to turn it.

The nut 9, established between the clip 1 and the thrust screw 6, is arranged in the same manner as the nut 5 already described. The box 23 of this nut is however rigidly attached to the clip 1 and the cooperating cam surface 24, intended for the locking of the slider, are arranged at the upper end of the casing, against which the slider is brought on rotation of the thrust screw 6 corresponding to the clamping of the clip.

In variations, the nuts and screws may comprise half-flats or other external forms enabling them to be rotated by means of a key.

It will be apparent that various other changes and modifications may be made in the embodiment described without departing from the inventive concept as defined in scope by the appended claims.

I claim:

1. A clamping device for immobilising an object on a support table comprising; a clip for holding the object on the table, at least one screw having means of anchorage to the table and an adjustable nut threadedly arranged on the screw for urging the clip against the object, the nut including a slider and a box, the slider being adapted for transverse movement in the box and having a surface provided with a tapped portion adapted to cooperate with the threading of the screw and being arranged to occupy in the box either a transversely advanced position in which the tapped portion cooperates with the screw or a transversely retracted position in which the tapped portion is spaced from the screw which can then freely slide axially in the box, the slider being also adapted for limited axial movement in the box, the two elements having cooperating cam surfaces arranged to lock the slider in the advanced position when an axial thrust is transmitted between the box and slider to tighten the clip while the slider may be put in retracted position in the absence of thrust between the box and slider to enable the displacement of the nut by axial movement along the screw, the slider having a nose radially extending outside the box through a slot in the wall of the box.

2. A device according to claim 1, wherein said nose is situated in diametrically opposite position to the tapped portion of the surface of the slider.

References Cited

UNITED STATES PATENTS

| | | | |
|---|---|---|---|
| 2,671,482 | 3/1954 | Gordon | 269—182 |
| 2,705,983 | 4/1955 | Guadagna | 269—174 |
| 3,352,341 | 11/1967 | Schertz | 85—33 |

FOREIGN PATENTS

| | | |
|---|---|---|
| 78,418 | 1931 | Sweden. |

WILLIAM S. LAWSON, Primary Examiner

D. D. EVENSON, Assistant Examiner

U.S. Cl. X.R.

269—181; 85—33